(12) United States Patent
Hjálmarsson

(10) Patent No.: US 7,368,670 B2
(45) Date of Patent: May 6, 2008

(54) METHOD FOR AUTOMATICALLY FEEDING A COMBINATION WEIGHER

(75) Inventor: Helgi Hjálmarsson, Kopavogur (IS)

(73) Assignee: Valka Ehf, Kopavogur (IS)

( * ) Notice: Subject to any disclaimer, the term of this patent is extended or adjusted under 35 U.S.C. 154(b) by 54 days.

(21) Appl. No.: 10/591,994

(22) PCT Filed: Mar. 8, 2005

(86) PCT No.: PCT/IS2005/000006

§ 371 (c)(1),
(2), (4) Date: Sep. 7, 2006

(87) PCT Pub. No.: WO2005/085776

PCT Pub. Date: Sep. 15, 2005

(65) Prior Publication Data

US 2007/0144792 A1 Jun. 28, 2007

(30) Foreign Application Priority Data

Mar. 9, 2004 (IS) .......................................... 7174

(51) Int. Cl.
*G01G 19/387* (2006.01)
*G01G 13/02* (2006.01)
(52) U.S. Cl. ................... 177/25.18; 177/119; 177/123; 222/77
(58) Field of Classification Search ............. 177/25.18, 177/116, 119–123, 145; 222/55, 56, 77
See application file for complete search history.

(56) References Cited

U.S. PATENT DOCUMENTS

| 4,308,928 A | 1/1982 | Oshima et al. |
| 4,398,612 A | 8/1983 | Mikami et al. |
| 4,421,185 A * | 12/1983 | Koto et al. ............... 177/25.18 |
| 4,442,910 A | 4/1984 | Mikami |
| 4,561,510 A | 12/1985 | Sugioka et al. |
| 4,600,096 A | 7/1986 | Yamano et al. |
| 4,615,403 A * | 10/1986 | Nakamura ............... 177/25.18 |
| 4,662,508 A | 5/1987 | Inoue et al. |
| 4,681,176 A * | 7/1987 | Moran et al. ............... 177/114 |
| 4,765,488 A * | 8/1988 | Moriarity .................... 209/551 |

(Continued)

FOREIGN PATENT DOCUMENTS

EP   1 074 822 A   2/2001

*Primary Examiner*—Randy W Gibson
(74) *Attorney, Agent, or Firm*—Knobbe Martens Olson & Bear LLP

(57) ABSTRACT

The invention is a method of automatically feeding and transporting food products from an in-feed device to a combination weigher, which automatically selects from a number of portions of known weight the optimum combination of portions to create a batch of fixed weight with minimum give-away The method consists mainly of ensuring that the raw material being processed, which typically consists of fresh and unfrozen food products of various kinds that are fragile and have the tendency to stick to the equipment underlay, especially fresh fish, poultry and meat products, fruit and vegetable products and other unfrozen food products of this type, is fed onto at least one or an unlimited number (n) of independent, endless movable conveyors (14a, 14b, . 14n) or (53) and (54-58) which are movable as a whole in both directions along their longitudinal plane independently and transport the product evenly, accurately and securely by means of these conveyors to a combination weigher (16) or (52).

12 Claims, 3 Drawing Sheets

U.S. PATENT DOCUMENTS

| | | |
|---|---|---|
| 4,821,820 A | 4/1989 | Edwards et al. |
| 4,874,049 A | 10/1989 | Kee et al. |
| 5,340,949 A * | 8/1994 | Fujimura et al. ........ 177/25.18 |
| 5,813,195 A * | 9/1998 | Nielsen et al. ................ 53/443 |
| 6,407,346 B1 | 6/2002 | Baker |
| 6,437,256 B1 * | 8/2002 | Miyamoto ............... 177/25.18 |
| 6,493,605 B1 | 12/2002 | Prideaux et al. |
| 6,787,712 B2 * | 9/2004 | Asai et al. ................ 177/25.18 |
| 7,057,118 B2 * | 6/2006 | Arnason et al. ......... 177/25.18 |

* cited by examiner

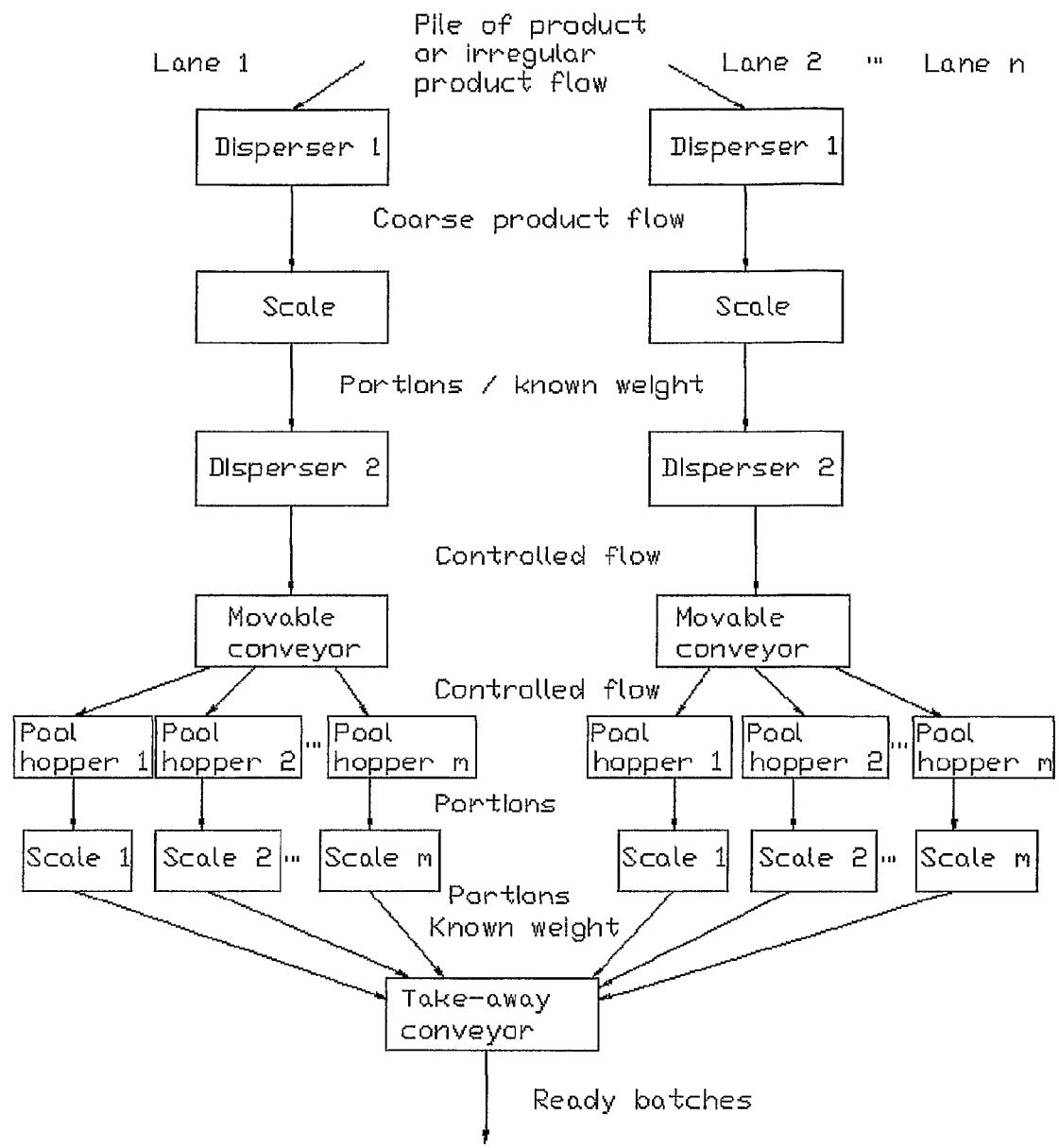
(Figure 1)

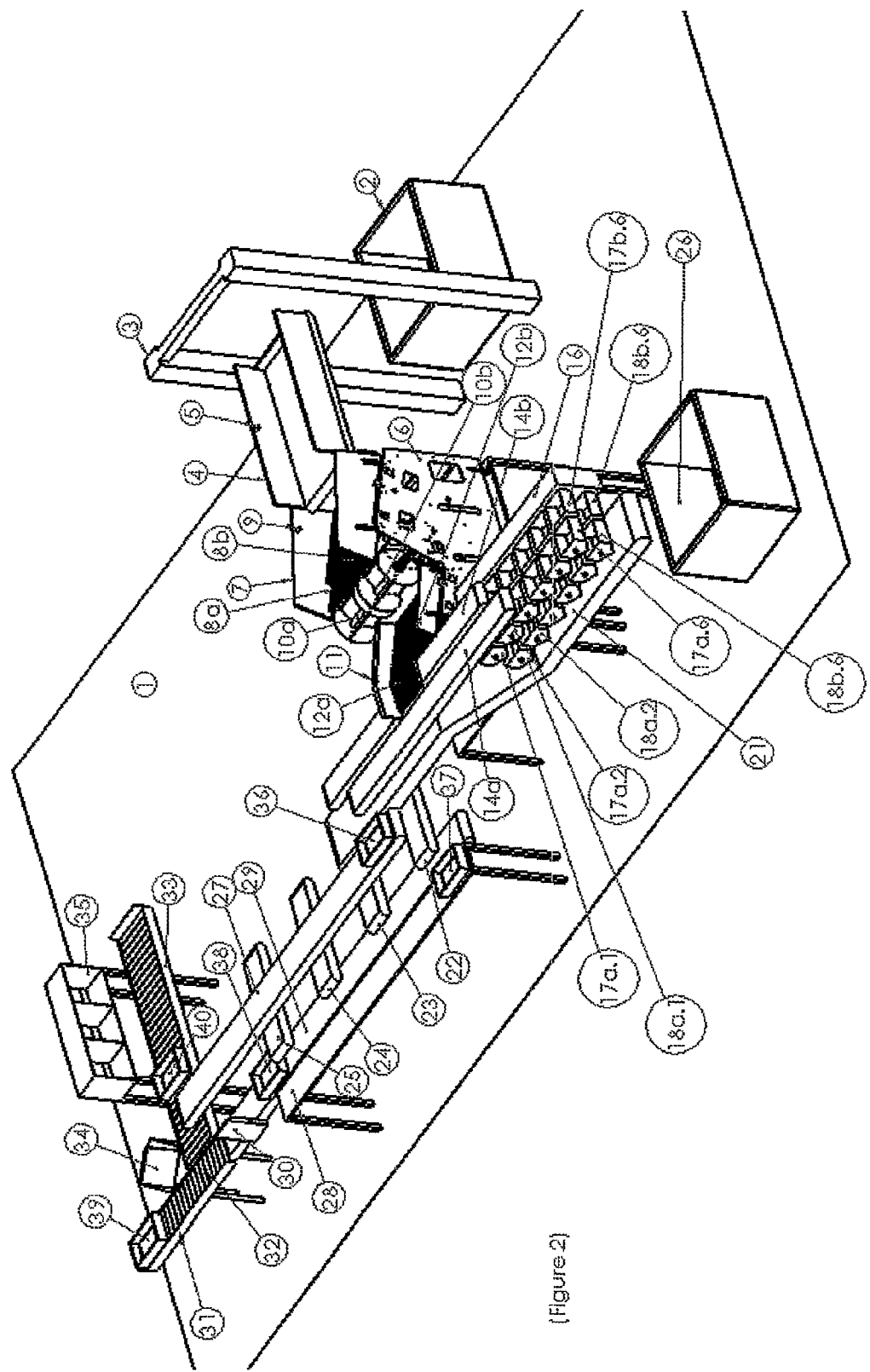
[Figure 2]

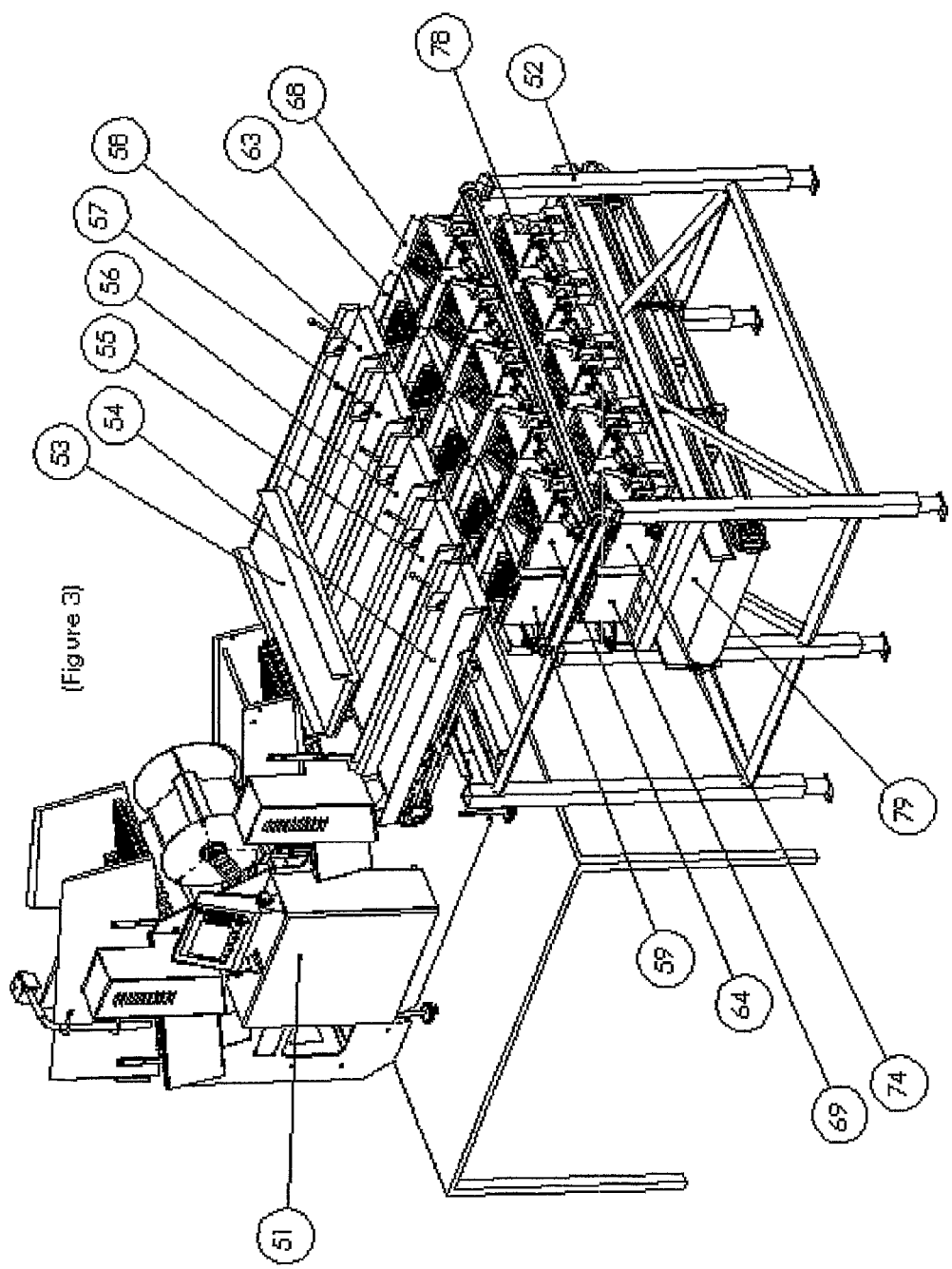
[Figure 3]

METHOD FOR AUTOMATICALLY FEEDING A COMBINATION WEIGHER

This application is the U.S. National Phase under 35 U.S.C. 371 of International Application No. PCT/IS2005/000006, filed Mar. 8, 2005, which claims priority to the Icelandic Patent Application No. 7174, filed Mar. 9, 2004. The International Application was published in English under PCT Article 21(2) on Sep. 15, 2005. All of the above-referenced applications are hereby expressly incorporated by reference in their entireties.

BACKGROUND OF THE INVENTION

This invention relates to a method for fully automatically feeding and transporting raw material of food products from bulk to a combination weigher, which then automatically selects from a number of portions of known weight the optimum combination required to make batches of fixed weight with minimum give-away.

The main purpose of the invention is to ensure that product is fed equally and accurately from bulk to the combination weigher, where the main feature of the invented method is, more precisely, the transporting of a measured and controlled amount of the food products from an infeed device to a combination weigher. The most important issue when feeding an combination weigher is to be able to control the average weight fed to the weighing hoppers which then weigh the product precisely. It is however not undesirable that there is some variation in the weight in each hopper as long as the average is kept at the desired level. The meaning of feeding the combination weigher precisely and accurately is therefore to be able to control accurately the average amount of product fed to the weighing hoppers.

Various types of infeed and dispersion equipment are known. These have been designed to feed a variety of products to automatic weighing equipment, including combination weighers. Most of this equipment is based on using vibration of some sort, and is designed for firm, non-sticky products, such as frozen food products, which do not tend either to stick together or to the surfaces of the equipment.

There are two main types of combination weighers; those in which the weighing hoppers are arranged circularly around a common axis, and others in which they are placed in a linear arrangement. In the former, the dispersion device is located at the centre of the circular array of weighing units, and the raw material is fed to its central portion dispersed in a radial direction and supplied to the pool hoppers. In the latter type, the dispersion device is located behind the weighing hoppers. Product is fed to the inlet end of the dispersion device and the outlet is next to the weighing hoppers. In both cases, however, the principle is basically the same, with an independent plate in front of each weighing hopper being vibrated when product is required in any given hopper. The main disadvantage of this method is that it is difficult to precisely control how much product goes into the hopper when the plates are vibrated.

Combination weighers do not always have one pool hopper above each weighing hopper. In some versions raw material in the pool hoppers can be weighed in such a way that better control is achieved of the weight of each product portion accumulated in the pool hopper before it is released to the weighing hopper. Other versions can include multiple pool hoppers placed above each of the weighing hoppers in order to ensure more rapid filling of the weighing hoppers. This is especially useful if the dispersion device does not feed product reliably when activated. Yet another variation is to place a pool hopper below the weighing hopper so that the product in the weighing hopper can either be released to the outlet trough or into the pool hopper. This gives the operator a greater variety of possible combinations as the weight of the product in the pool hoppers below the weighing hoppers is known. An increased number of possible combinations generally leads to better performance of the combination weigher in terms of reduced over-weight or increased capacity.

Several patents exist for dispersion devices. One of the first patents for an automatic weighing device with a dispersion device as a critical component is U.S. Pat. No. 4,398,612. Another, newer patent which also describes a dispersion device for dispersing product to a circular array of weighing hoppers is U.S. Pat. No. 4,561,510, and a similar device has also been patented in U.S. Pat. No. 4,600,096. These patents share in common the inclusion of multiple dispersion devices operating on the same pile of products. Each device can be individually controlled, and thus used to selectively feed multiple weighing hoppers or pool hoppers located above weighing hoppers.

Examples of combination weighers of the latter type mentioned above, that is those involving a linear arrangement of pool and weighing hoppers, are described in U.S. Pat. Nos. 4,442,910 and 4,821,820. However, these combination weighers do not provide automatic feeding into each hopper, and are therefore fed manually.

When processing sticky products—e.g. fresh fish, meat, fruit, vegetables or other similar fresh food products, dispersion devices which are based on the use of vibration as a means of transfer are no longer usable.

Several attempts have been made to design dispersion devices for sticky products that cannot be conveyed by vibration. One example is U.S. Pat. No. 4,662,508, where rotating discs in a horizontal plane are used to disperse the product. Another example is U.S. Pat. No. 6,493,605, where flexible tabs and vertical movement of the inlet chute are used to obtain more uniform feeding to the dispersion tables.

Neither of these two methods is sufficiently effective to convey sticky product reliably or accurately enough to the weighing hoppers. Furthermore, the quality of the handling of sensitive product such as fresh fish fillets or pieces is not acceptable.

It should, however, be mentioned that a combination weigher has been produced by Pols ehf, a company based in Iceland, which can be used to create batches of sticky food products, mainly fish, of fixed weight with minimum give-away. But as no automatic dispersion devices are connected to this weigher, it must be fed manually, which reduces its capacity. The need for manual labour to feed this combination weigher also makes it more expensive to operate.

For many years, very little progress has been made in the development of equipment for the packaging of fresh fish products. As a result, packaging remains a highly labour-intensive—and therefore expensive—activity in which give-away is higher than it need be if performed automatically using an accurate combination weigher. Further encouragement for the invention described comes from the fact that fish products are now being increasingly sold fresh from Iceland to markets in Europe, where the call is for smaller batch sizes. Whereas a few years ago these were often 10-15kg, a batch size of 2 kg is now common. As a result, the need for labour is even greater than before, with significant cash being lost due to unnecessarily high give-away.

It is therefore clear that none of the known methods or equipment is suitable for solving the problem of packaging sticky food product. The invention relates to a means of feeding sticky product, such as fresh fish products, quickly, precisely and accurately from bulk to a combination weigher, in such a way that the quantity fed will be well controlled.

BRIEF DESCRIPTION OF THE INVENTION

The main objective of the invention is therefore to establish a method and provide the equipment necessary for solving the problem outlined above, and increase, among other things, automation, accuracy and capacity in the packaging of sticky products with minimum give-away, the aim being to raise automation in the packaging of sticky products to the same level as is now found in the packaging of firm, non-sticky products.

It should, however, be noted that the invention can also be used for feeding, transporting and batching non-sticky products.

To achieve the objectives described above, the following method is used which is unique according to Claim No. 1, wherein raw material is evenly and accurately conveyed to one or an unlimited number (n) of independent, endless conveyor belts which can be moved as a whole in both directions along their longitudinal plane. The conveyors transport the raw material to a combination weigher, which has a number of rows of pool and weighing hoppers equal to the number of conveyors, with each conveyor feeding product to one row of pool and weighing hoppers. The number of pool and weighing hoppers in each row is at least one of each, and the number n signifies an integer greater than or equal to 2.

The objective of the invention will also be uniquely obtained according to the remaining dependent Claims Nos. 2-10.

BRIEF DESCRIPTION OF THE DRAWINGS

The invention is explained in greater detail here, with reference to figures where required:

FIG. 1 shows a flow diagram of the in-feed system and the combination weigher.

FIG. 2 shows the preferred embodiment of the in-feed and transport system and the combination weigher and the packaging solution as a whole, with a 3D image view from an angle above the system FIG. 3 shows an alternative to the preferred embodiment where multiple layers of in-feed conveyors are used to improve performance. Note that the tub tipper and the in-feed conveyor in front of the infeed control and dispersion machine have been omitted in this Figure.

DESCRIPTION OF THE PREFERRED EMBODIMENT

FIG. 1 shows a flow diagram of the in-feed system and a combination weigher from the bulk feeding system (tub tipper (3)) to the take-away conveyor (21), which serves as an in-feed conveyor for the packaging line. Each box in FIG. 1 depicts a significant unit within the system The flow diagram (FIG. 1) clearly shows the structure of the system and how product flows through it. FIG. 1 also shows that there are two lanes, or product streams, running from the bulk feeding system to the take-away conveyor and that these two lanes are fully independent. The system may just as easily include only one lane, more than two, or as many as n lanes (where n is any integer greater than 2), depending on the needs of each production plant. A computer is essential for controlling the proper functioning of the system, but it is neither shown in the flow diagram (FIG. 1) nor in the diagram with the preferred embodiment (FIG. 2).

The raw material that the preferred embodiment is to work with and has to be gathered into portions of fixed weight and packaged as fresh fish product, thereby falling into the category of sticky product, is fed from a tub (2) into the system as shown in FIG. 2. Other fresh, sensitive, sticky product, such as various kinds of fresh meat products, fruit and vegetable products and other non-frozen food products, could be processed by the system equally well. As mentioned above, the system can also be used for firmer products, such as frozen food products.

The tub (2) is placed in the tub tipper (3), which is manufactured in such a way that the drop from the tub onto the conveyor (4) is kept to an absolute minimum, to ensure gentle handling of the product. A product sensor (5) is attached to the conveyor (4) and is connected to the computer (not shown in the diagrams), which controls the tipping of the tub so that a constant amount of product is maintained on the conveyor (4) at any given time. From the conveyor (4), the product goes to a device designed for feeding fresh fish products into an IQF freezer, or to other type of equipment where maintaining an even product flow is very important. The device consists of two product dispersers (7 and 11) and two revolving scales (10a and 10b). The first disperser has two lanes, right lane (8a) and left lane (8b), left and right being defined according to the direction of the product flow. Both lanes are fully independent of each other. The second disperser (11) also has two lanes, right lane (12a) and left lane (12b), and these are also fully independent. Another embodiment of the device could consist of only one lane in the dispersers and only one scale, or there could be a plurality of lanes and scales, up to an unlimited number (n). The raw material goes from the conveyor (4) directly to the first disperser (7), where product sensors (9), one on each lane, provide information about the level of product in the first disperser (7) to the control computer, which starts and stops the conveyor (4) to ensure that the amount of product in the disperser is always as even as possible. From the first disperser, the raw material goes to the revolving scales (10a, 10b), which weigh the product flow and control precisely how much product per time unit goes into the second disperser (11). The right revolving scale (10a) and left revolving scale (10b) are fully independent.

The infeed control and dispersion device works as follows. The first disperser (8a) is run until a specified weight has been gathered on the revolving scale (a), at which time the disperser (8a) is stopped. When the revolving scale (10a) has become steady, the weight of the product in the scale is determined precisely and it is then released into the second disperser (12a). The process then starts again with the filing of the revolving scale, but the product collected in it is not released until the apposite amount of time has passed from the previous release. For example, if the objective is to feed 600 kg/hour on the right lane, this is equivalent to 10 kg/minute. If the first portion in the scale was exactly 5 kg, the next portion would be released 30 seconds later. If the second disperser (12b) has to be stopped, the waiting time will increase proportionately and can thus become more than 30 seconds.

The raw material moves from the right lane (12a) of the second disperser (11) to an endless movable conveyor (14a) and from there to the combination weigher (16). As shown in FIG. 2, the combination weigher is made up of a double row (17a, 17b) of pool hoppers (17a.1-17a.6 and 17b.1-17b.6), which in the preferred embodiment number 6 in each row, but can range from one to any number. Below each row of pool hoppers are corresponding rows (18a, 18b) of weighing hoppers (18a.1-18a.6 and 18b.1-18b.6), which number as many as the pool hoppers in each row. The final pool hoppers in each row (17a, 17b) are labelled (17a.6 and 17b.6), and the weighing hoppers below them are labelled in a similar manner (18a.8 and 18b.6). Other versions could include only a single movable conveyor (e.g. 14a), two moveable conveyors, or any number at all, in which case a corresponding number of rows of hoppers would be included in the combination weigher. At the same time, the number of pool hoppers and weighing hoppers in each row can be as many as required by the demands for accuracy and capacity being made on the combination weigher.

To carry the product to the correct pool hopper, the movable conveyor (14a) is moved as a whole, so that its out-feed end is directly above the corresponding pool hopper in the respective row marked (17a). When the conveyor has reached this position, the belt is run for the time required to get the right amount of product into the pool hopper. By weighing raw material into the system using the revolving scales (10a and 10b), it is known fairly accurately how many grams of product are on each metre of the conveyor (14a). Typically product is fed to the conveyor from the second disperser (12a) when the moveable conveyor (14a) is moved as a whole from the in-feed device (6) towards the combination weigher (16) (see FIG. 1), and also when the conveyor is running. By contrast, when the moveable conveyor (14a) is moved as a whole in the opposite direction, there is no need to feed product onto the conveyor. In this way it is possible to ensure that there is always an even quantity of product on the conveyor between the disperser (12) and its out-feed end (14a). As can be seen in FIG. 2, the movable conveyor (14a) is located for feeding the third pool hopper (17a.3) in the row marked (17a).

In the same manner as described above, the left-latter disperser (12b) transports the raw material onto the movable conveyor (14b), which feeds it to the pool hoppers (17b.1-17b.6) in row (17b). These two product streams on conveyors (14a and 14b) are fully independent. It can also be seen from FIG. 2 that the movable conveyor (14b) is located for feeding the second pool hopper (17b.2) in row (17b).

In the beginning, product is fed to all the pool hoppers and is released from them into the corresponding weighing hopper. For example, pool hopper (17a.1) in row (17a) releases into weighing hopper (18a.1) in row (18a), and so on. The pool hoppers are then filled again with product. When the weight in each weighing hopper has been precisely determined, the system then automatically calculates which weighing hoppers contain the combined weight which is least over the target weight. As an example, let us assume that the weights in the weighing hoppers (18a.1-18a.6 and 18b.1-18b.6) are as follows:

[102 g], 455 g, [224 g], 354 g, [554 g], 432 g, 677 g, [788 g], [333 g], 934 g, 398 g, 254 g

Let us also assume that the target weight is 2000 g. In this case, the choice would be made to release from weighing hoppers 1, 3, 5, 8, 9 (or more precisely 18a.1, 18a.3, 18a.5, 18b.2, 18b.3), which are the weights shown in [ ], but their combined weight is:

Batch weight=102+224+554+788+333=2001 g.

When product has been released from these weighing hoppers on to the take-away conveyor (21), the weighing hoppers are immediately filled again by releasing product from the corresponding pool hoppers above each of the weighing hoppers. The pool hoppers are then filled again by the conveyors (14a, 14b) as required, and a new batch is made by selecting the appropriate combination of weights in the weighing hoppers. Product can be fed as well to non-empty pool hoppers if desired.

As was mentioned above, the complete batch is released onto the take-away conveyor (21), which carries it to the packing conveyors (22, 23, 24 and 25). The out-feed end of the take-away conveyor (21) is then moved to the right packing conveyor, in order to control to which of the packing conveyors the batch will go. In FIG. 2 the out-feed end is at the location for packing conveyor (23), and the batch would therefore be directed to that conveyor.

If the batch weight obtained from the optimum combination is still above acceptable give-away, it is possible to reject product from some of the weighing hoppers by releasing their contents onto the take-away conveyor (21). The take-away conveyor (21) is then run in the opposite direction—in FIG. 2 from left to right—so that the rejected product goes into the reject tub (26).

An operator (not shown in FIG. 2) takes an empty box (36) from a box-feeding conveyor (27) and places it on the packing table (28). At each packing conveyor there is a sensor, not shown in FIG. 2, to determine whether or not a box is present. If there is, and there is a batch ready on the packing conveyor (27), the conveyor will run and the batch will go into the box. When the batch goes into the box (37), the operator ensures that the fillets or pieces being packed are properly arranged in the box (37). When the full batch has been put in the box (36), the operator places it on a conveyor (29) which carries it (38) to a dynamic check-weigher. From there, the box goes onto a roller conveyor (31). If the weight of the box is within predefined limits, a transport mechanism (32) is used to rove it onto another roller conveyor (33). Once there, an operator places, for example, a plastic film and bag with ice into the box and closes it. The lids, plastic film and ice can be stored on a movable shelf (35). Boxes whose weight is outside the pre-defined limits travel all the way to the end of the first roller conveyor (31). From there, an operator takes the box (39), places it on a manual check-scale (34), and adds or removes product to render the batch within the predefined limits. Finally, the operator places the rejected box onto the second roller conveyor (33).

Other configurations of the packaging solution are possible, one example being where product batches would go directly from the take-away conveyor (21) to an automatic bagger or other type of equipment for packaging.

To ensure that the sticky product being processed will be released reliably from the movable conveyors (14a, 14b . . . 14n) into the pool hoppers, it is possible to have their out-feed end as thin as possible by incorporating a shaft with minimum radius at the out-feed end. It is then possible to have the conveyor belts covered with small nubs or ribs to minimise the contact area between the product and the conveyor, and so the adhesion of the product to the conveyor. It is also possible to equip the conveyors with a scraper to scrape raw material off the out-feed end of the conveyor.

The invention is not limited to the preferred embodiment described here. A variety of other implementations are possible. For example, additional independent lanes can be added to the in-feed device (6). Another option might be to increase capacity and/or accuracy by placing two rows of pool hoppers above the weighing hoppers, or to place pool hoppers below the weighing hoppers, so allowing the user to decide whether product is to be released from the weighing hoppers onto the take-away conveyor (21), or into the pool hoppers below the weighing hoppers. It is also possible to omit having pool hoppers above the weighing hoppers in order to reduce costs, but this would also result in reduced capacity.

Further possibility is to use fewer movable conveyors (14a, ... 14n) than there are rows of pool hoppers (17a, ... 17n), in which case it would also be necessary to be able to move the movable conveyors sideways While this would result in reduced capacity, it might also reduce costs.

Yet further possibility is to rotate the movable conveyor(s) around its in-feed end. This assumes that the pool hoppers would be arranged around a common axis in which each row (17 a. . . 17n) would have a different radius, and movement along the radii would determine which row of pool hoppers would be used.

In some instances it can be beneficial to have another layer of moveable conveyors. The objective is to use a single infeed device to feed multiple movable conveyors which can provide more economical configuration in some instances. The embodiment of this alternative is shown in FIG. 3. The infeed control and dispersion machine (51) feeds product to the moveable conveyor (53), which then feeds product to any of the conveyors (54) to (58) by means of its transversal arrangement with respect to these conveyors as well as the infeed and dispersion machine (51). The conveyor (53) can feed product in its current location to conveyor (58) and also to conveyor (55) by reversing the direction in which the conveyor belts runs. By moving conveyor (53) as a whole the other conveyors (54, 56 or 57) can be fed as well. Each of the conveyors (54-58) feed then either one of the pool hoppers in the same row, e.g. conveyor (54) feeds pool hopper (59) in its current location and when moved forward it will feed pool hopper (64). Underneath each pool hopper is a weighing hopper and the process is identical to the description here above of the preferred embodiment, where the complete batch is released onto the take-away conveyor (79), which carries it to the packing conveyors.

In a combination weigher with a given number of weighing hoppers it is clear that as the number of hoppers fed by each movable conveyor decreases more hoppers can be fed simultaneously which increases the capacity of the combination weigher(52). But as the number of conveyors increases the more complicated it is to control the product flow to each conveyor. The embodiment demonstrated in FIG. 3 will eliminate the need for multiple infeed control and dispersion machine and a single such machine can thus feed the product reliably to any number of conveyors.

The invention claimed is:

1. A method of automatically feeding and transporting food products from an in-feed device to a combination weigher, which automatically selects from a number of portions of known weight the best combination from which to make a batch of fixed weight with minimum give-away, comprising feeding raw material from bulk by means of a tub tipper and a conveyor belt onto a infeed and dispersion machine, consisting of two product dispersers and revolving scales, and thereafter onto the moveable transporting device, wherein the method is characterized by feeding the raw material evenly and accurately onto at least one and up to an unlimited number of independent, endless movable conveyors, which are moveable in both directions along their longitudinal plane independently of each other, and then, when the conveyor belt (s) is running, transporting the raw material to a combination weigher, consisting of a corresponding number of rows of pool hoppers, where each row can have an unlimited number of pool hoppers and a corresponding number of rows of weighing hoppers as befits the number of movable conveyors, with one particular moveable conveyor feeding one particular row of pool hoppers and weighing hoppers.

2. The method according to claim 1, wherein the endless movable conveyors are covered evenly and accurately with an almost fully continuous, known amount of product per unit length of the conveyor.

3. The method according to claim 2, wherein the in-feed to the endless moveable conveyors providing the almost continuous, known amount of product per unit length is obtained by an infeed and dispersion machine which has the same number of pairs of dispersers and as well as scales as the number of movable conveyors dictates, where one particular disperser lane corresponds to one particular movable conveyor.

4. The method according to claim 1, wherein, when a particular pool hopper in a particular row is empty, the corresponding endless conveyor, which is covered with a known amount of product per unit length, is moved until its out-feed end is directly above the respective empty pool hopper, and the conveyor is then started and run for a certain amount of time so that the appropriate amount of product is placed in the pool hopper.

5. The method according to claim 1, wherein the in-feed to the endless movable conveyors is started both when the conveyors are running to feed an empty pool hopper and also when they are moved as a whole away from the in-feed device towards the combination weigher; product is, however, not fed onto the movable conveyors when they are moved as a whole in the opposite direction.

6. The method according to claim 5, wherein the velocity of the movement of the movable conveyors is the same as the velocity of the conveyor belt when product is being released from them.

7. The method according to claim 1, wherein the product is mainly fresh and unfrozen food products of various kinds, which are fragile and have a tendency to stick to the conveyor underlay.

8. The method according to claim 1, wherein the endless movable conveyors can be moved a sufficient distance from the in-feed equipment towards the combination weigher, in order to release excess products into the reject tub which can be placed at the end of the combination weigher which is further away from the in-feed device.

9. The method according to claim 1, characterised by feeding the raw material evenly and accurately onto the endless and moveable conveyor, which then feeds the raw material to any of the endless and moveable conveyors by means of its transversal arrangement with respect to the infeed and dispersion machine as well as the conveyors and also being moveable in both directions along its longitudinal plane and further being able to run its conveyor belt in both directions.

10. The method according to claim 1, wherein the independent, endless and back and forth moveable conveyors feeding the raw material evenly and accurately onto a combination weigher, consists of at least the same number of rows of pool hoppers and weighing hoppers as there are of moveable conveyors, with one particular movable conveyor feeding one particular row of pool hoppers and weighing hoppers.

11. The method according to claim 9, wherein the independent, endless and back and forth moveable conveyors feeding the raw material evenly and accurately onto a combination weigher, consists of at least the same number of rows of pool hoppers and weighing hoppers as there are of moveable conveyors, with one particular movable conveyor feeding one particular row of pool hoppers and weighing hoppers.

12. The method according to claim 7, wherein the fresh and unfrozen food products are selected from the group of sticky products consisting of fresh fish, fresh meat, fruit, vegetable(s) and unfrozen food products.

* * * * *